United States

Tournois

[11] 3,719,906

[45] March 6, 1973

[54] DISPERSIVE DELAY LINES OPERATING IN THE SHEAR MODE

[75] Inventor: Pierre Tournois, Cagnes-sur-Mer, France

[73] Assignee: Thomson-CSF, Paris, France

[22] Filed: Nov. 12, 1970

[21] Appl. No.: 88,674

[30] Foreign Application Priority Data

Nov. 25, 1969 France..................6940587

[52] U.S. Cl. ...............333/30, 333/72, 350/321, 350/96

[51] Int. Cl. ...............H03h 7/30

[58] Field of Search ..........333/30, 72, 71; 250/199; 350/321, 96; 329/129

[56] References Cited

UNITED STATES PATENTS

| | | | |
|---|---|---|---|
| 3,522,557 | 8/1970 | Duncan et al. | 333/30 |
| 3,464,033 | 8/1969 | Tournois | 333/30 |
| 3,564,460 | 2/1971 | Sittig | 333/30 |
| 3,562,676 | 2/1971 | Parker | 333/30 |
| 3,522,557 | 8/1970 | Duncan | 333/30 |
| 3,300,739 | 1/1967 | Mortley | 333/30 |
| 3,551,034 | 12/1970 | Tournois | 350/321 |
| 3,431,504 | 3/1969 | Adler | 329/129 |
| 3,387,233 | 6/1968 | Parker | 333/30 |
| 3,464,033 | 8/1969 | Tournois | 333/30 |
| 3,589,794 | 6/1971 | Marcatili | 350/96 |
| 3,586,872 | 6/1971 | Tren | 350/96 |

OTHER PUBLICATIONS

"Investigation Of Methods For Exciting Rayleige Waves" by Viktorov, Soviet Physics–Acoustics Vol. 7, No. 3 Mar. 1962 pp. 236–244

*Primary Examiner*—Herman Karl Saalbach
*Assistant Examiner*—Saxfield Chatmon, Jr.
*Attorney*—Flynn & Frishauf

[57] ABSTRACT

A wave transmission medium has a pair of wave coupling arrays (41, 42) coupled thereto, each including a plurality of rectilinear, co-planar parallel excitation elements, spaced from each other by a predetermined distance $a$; the wave reception array being located on the transmission medium with respect to the wave transmission array to receive waves at an angle $\alpha$ transmitted into said medium, when a transversely polarized wave is applied to the transmission array, with a direction of oscillations parallel to the co-planar excitation elements; the angle $\alpha$ having a predetermined relation to the wavelength and propagation velocity of waves within the medium.

20 Claims, 11 Drawing Figures

DISPERSIVE DELAY LINES OPERATING IN THE SHEAR MODE

The present invention relates to dispersive delay lines operating in the shear mode, and more particularly to optical, or acoustic delay lines in which the delay time depends on the frequency of applied waves, with respect to a certain center frequency, and is proportional to frequency deviation within a band. Such delay lines are utilized, for example, in pulse compression techniques, and, if used for optical applications, can form part of interferometers.

Various types of dispersive delay lines are available; several utilize diffraction gratings to diffract acoustic waves, the dispersion within the delay line being due to the effective length of the path of the waves between the entrance and the exit of the waves from the line, and varying as a function of frequency. Most of these delay lines utilize an array of lines, grooves, engraved grids or the like, having a variable spacing. Difficulties result in manufacture, since such arrays of lines are complicated to make when the lines are close together to operate at high frequencies. As the frequency increases, the spacing of the lines decreases more and more.

Acoustic delay lines have been proposed in which surface waves are excited by a transducer placed on one plane face of a material, and are guided along the plane face and diffracted by a grid applied to the face in such a manner that the grid lines are perpendicular to the vibratory plane of the surface wave. The diffracted wave will then have a longitudinal component, or compression component which is eliminated by appropriate means; and, further, a transverse, or shear component, having a direction of vibration which is contained in a plane perpendicular to the lines of the grid. Another plane face of the material, parallel to the first, has a second diffraction grid applied thereto which is sensitive to the transverse component of the wave; this transverse component is transformed into a surface wave and guided on the second plane face of the surface. The direction of vibration of the wave will be in a plane perpendicular to the grid lines of the second grid. Such a delay line utilizes two grid networks, or two grid arrays with a constant, equidistant spacing of lines which are parallel to each other.

It is an object of the present invention to provide a dispersive delay line which utilizes the phenomenon of double diffraction by means of diffraction arrays, having a constant line spacing, and which has a wide band width, is effective in use, and simple to manufacture.

Subject matter of the present invention:

Briefly, the lines of the arrays to diffract an incident wave are parallel, and have a constant spacing. The wave to be diffracted is a polarized wave so that a shear wave is introduced into the element of the delay line, having directions of vibrations parallel to the lines of the grid arrays. This combination permits, among other features, that the diffracted component of the wave need not be eliminated. The angle of transmission of the shear wave within the wave transmission medium itself is a function of applied wave length and wave transmission velocity.

The invention will be described by way of example with reference to the accompanying drawings, wherein.

Figure 1:
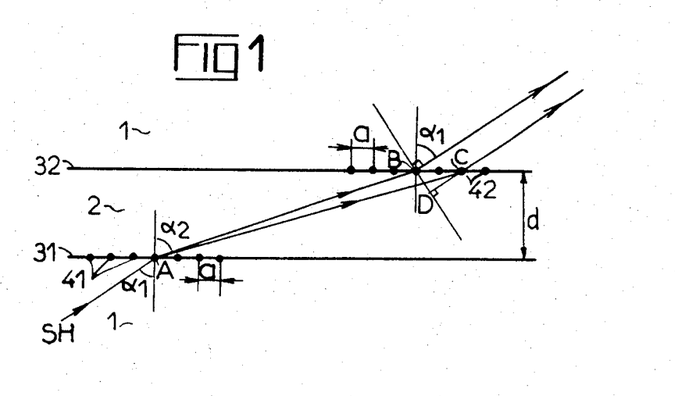
FIG. 1 is a schematic diagram of an apparatus in accordance with the present invention.

General explanation, with reference to FIG. 1:

A thick plate or lamella with parallel, plane faces of a suitable material 2 is placed in a medium 1, on either side of the lamella 2. The lamella has a thickness $d$ which is large with respect to the wavelength of the wave to be propagated.

When a transverse wave SH with horizontal polarization is applied, it will propagate at constant intensity in the medium 1. Horizontal polarization implies that the direction of vibration is perpendicular to the plane of the drawing of FIG. 1. The movement of the particles will likewise be perpendicular to the plane of FIG. 1. An interesting property of these transverse waves with horizontal polarization is, that when the waves SH pass from one medium to another, they give rise only to waves of a similar type; and that the similar type waves are either refracted or reflected. There is no energy converted into longitudinal waves or compression waves or into transverse waves having vertical polarization. This property of the horizontally polarized wave is believed to be due to the direction of movement of particles. The direction of motion of these particles is not modified during reflection or refraction of the waves. Thus, ordinary optical laws can be applied to these waves. Medium 2 is so selected that the propagation velocity $C_2$ of the transverse horizontally polarized wave SH in the medium 2 will be greater than the velocity $C_1$ of the same wave in medium 1.

It can be shown that when a wave SH is incident on the separation surface 31 between the media 1 and 2 under an angle which is greater than the angle of the refraction limit, a surface wave will exist besides the reflected wave. The surface wave will propagate along surface 31, with directions of vibrations of the wave parallel to surface 31. The angle $\alpha_1$ of incidence must be selected such that $\sin \alpha_1 > C_1/C_2$; the surface velocity is given by $C_1/(\sin \alpha_1)$. This wave vanishes in the medium 2 and is not re-radiated. As FIG. 1 shows, a grid array 41 is interposed in the trajectory of the surface wave. Grid 41 has a constant pitch, or line spacing $a$. The lines of the grid array are parallel to the direction of vibration of the surface wave. The vibrating energy exciting the grid 41 is thus radiated interiorly, that is within the depths of the medium 2 as a wave vibrating in shear mode. This radiation is due to the diffraction of the surface wave by the grid 41. The introduction of the grid 41 into the path of the surface wave, horizontally polarized, results in the creation of aligned radiating sources illuminated in accordance with a phase law which depends on the velocity of the surface wave $C_1/(\sin \alpha_1)$, this alignment radiating then vibratory energy into the medium 2. It can be shown that this energy is radiated as a transverse wave with horizontal polarization, having an angle of emergence, $\alpha_2$, defined as follows:

$$\sin \alpha_2 = (C_2/C_1) \sin \alpha_1 - p \lambda /a \ldots \quad (1)$$

wherein $\lambda$ is the wavelength of the wave within the medium 2, and $p$ is a positive whole number representing the order of radiation of the emerging wave.

Let $C_2/C_1 \sin \alpha_1 = m \ldots$ (2), then the relation (1) above becomes $$\sin \alpha_2 = m - p (\lambda /a) \ldots \quad (1a)$$

The emerging wave reaches the second face 32 of the lamella of medium 2 under the same angle of incidence $\alpha_2$. A grid network 42 of the same constant pitch $a$ as that of array 1, and having parallel lines, parallel in themselves to those of array 1, is located on the second face 32. Due to symmetry, output is available into the medium 1, which will again be a transverse wave SH, horizontally polarized, and having a direction parallel to that of the incident wave SH.

The output radiation is independent of the angle $\alpha_2$, determining the path of the wave SH within the medium 2. The delay of the wave SH at the output, with respect to a reference taken at the input will depend on the angle $\alpha_2$ and, therefore, on the frequency of the incident wave. The element of FIG. 1 is thus a dispersive delay element and thus can be used as a dispersive delay line.

Point A may be taken as the origin of a wave which is applied to the array 41. The reference output of this wave may, for example, by at point B of the array 42. The path AB will then be obtained by radiation of an angle $\alpha_{20}$, defined by $\sin \alpha_{20} = C_1/(C_2 \sin \alpha_1)$. The delay time variation $P \Delta t/a$ of the output wave with respect to the input is then given by $\Delta t = t_{AC} - t_{CD} - d/(C_2 \cos \alpha) \ldots$ (3) wherein $d$ is the thickness of the lamella 2. The variation $\Delta t$ of this delay time is then defined by:

$$\Delta t = [(d \sin \alpha_1)/(C_1 \cos \alpha_2)] [(C_1/C_2 \sin \alpha_1 - \sin \alpha_2)] \quad (4)$$

Figure 2:
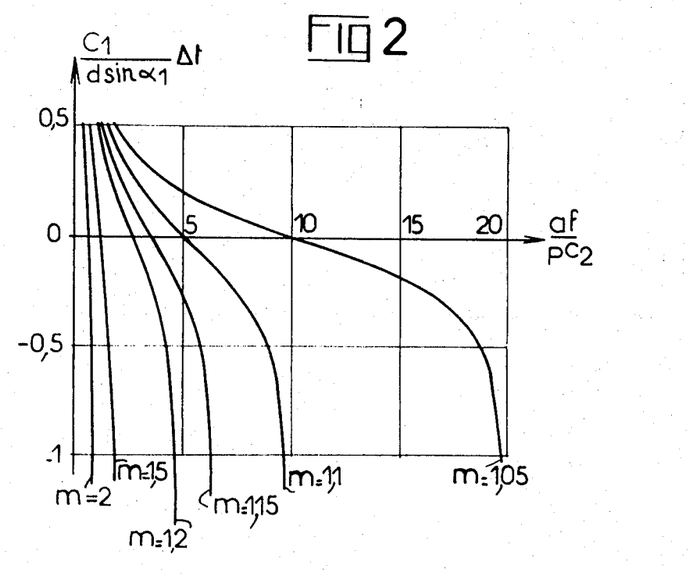
FIGS. 2 and 3 are graphs explaining the dispersion phenomena utilized by the present invention.

This relationship, which has a definite relationship with the formula $$\sin \alpha_2 = (C_2/C_1) \sin \alpha_1 - p(\lambda /a) \quad (5)$$

permits the drawing of a family of curves, as illustrated in FIG. 2, in which the ordinate defines the normalized variation of the delay time $$C_1/(d \sin \infty_1) - \Delta t \quad (6)$$

as a function of normalized frequency, which can be expressed as follows:

$$\frac{af}{pC_2} = \frac{1}{\dfrac{C_2}{C_1} \sin \alpha_1 - \sin \alpha_2} \quad (7)$$

The graphs are shown for different values of $m$ (as defined in formula 2). The curves all have an inflection point corresponding to zero $\Delta t$ delay time. The emerging angle $\alpha_{20}$ from the medium 2 is defined by $$\sin \alpha_{20} = C_1/(C_2 \sin \alpha_1) \ldots \quad (8)$$

Figure 3:
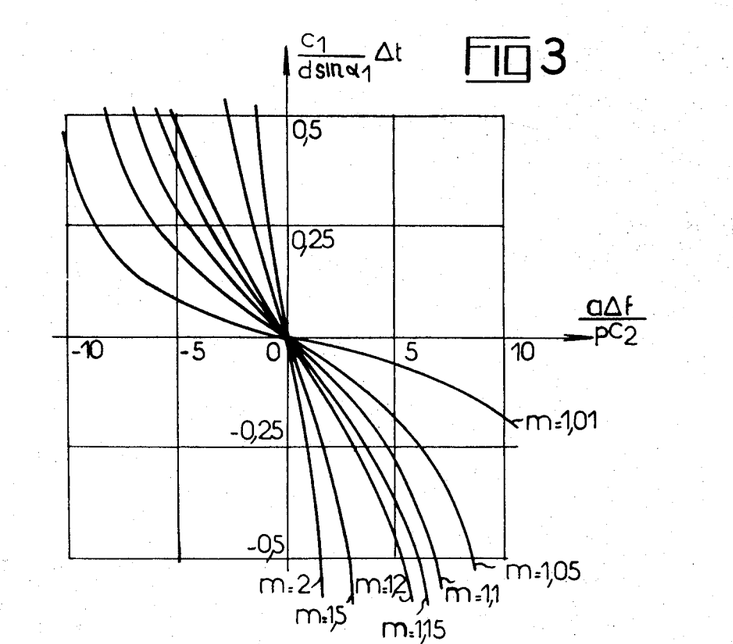

The variation $\Delta t$, from one side of the other of the inflection point, is linearly modified as a function of the frequency $f$ within a band width in the order of from 40 percent to 50 percent. FIG. 3 shows the same family of curves with transposition of the frequency about a central frequency corresponding to an inflection point. Starting from this family of curves, the nature of the material to be selected for media 1 and 2 can be determined, in order to obtain a delay line which has such characteristics that a product BxT, if given, can be obtained from a given delay line with a selected degree of linearity. T is the band width of delay time, and B the frequency excursion of the frequency band under consideration.

Figure 4:
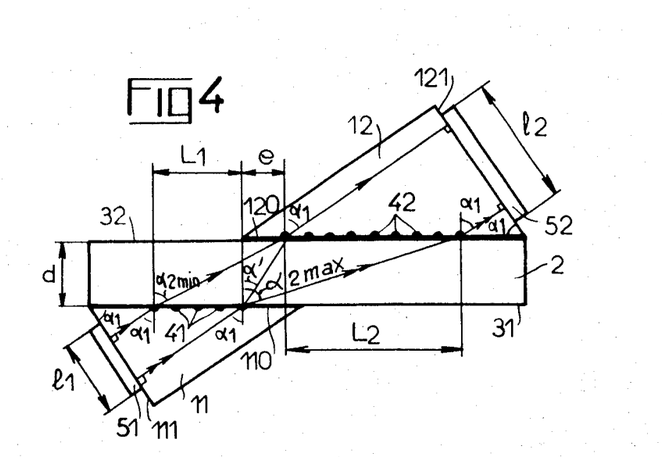
FIG. 4 is a specific example of an acoustic delay line.

FIG. 4 shows an actual delay line in accordance with the present invention. A pair of similar prisms, 11 and 12, for example of glass or quartz, form the medium 1; medium 2 is a thick lamella, for example of beryllium. Faces 110, 120 of prisms 11, 12 have arrays 41, 42 applied thereto, for example by engraving or the like, with constant pitch 2. These faces can be adhered to the corresponding faces 31, 32 of lamella 2. Transducers 51 and 52, formed for example of polarized ceramic, excite shear waves. They are located on faces 111, 121 of prisms 11 and 12. The faces 111, 121 form an angle $\alpha_1$ with faces 110, 120 of the prisms, and are parallel to each other.

Upon emission of a wave SH by transducer 51, the direction of propagation will first be perpendicular to face 111. Upon reaching array 41 under an incident angle of $\alpha_1$, the wave is diffracted and will propagate in the lamella 2 with an angle $\alpha_2$. The angle $\alpha_2$, with respect to the perpendicular line to the array 41 will vary as a function of frequency between the values $\alpha_2$ min and $\alpha_2$ max. These limits correspond to the lower and upper limits of the frequency band B for which the line is designed. After a second diffraction by array 42, the wave is applied to the receiving transducer 52 which, again, is perpendicular to face 121 of prism 12. Let $l_1$ and $l_2$ be the width of transducers 51 and 52, and $L_1$ and $L_2$ be the width of the arrays 41, 42 then the conditions for the illumination of the respective grids will be:

$$l_1 \geq L_1 \cos \alpha_1 \ldots \quad (9a)$$

$$l_2 \geq L_2 \cos \alpha_1 \ldots \quad (9b)$$

The offset between the arrays 41 and 42 will be determined by $$\tan \alpha_{2min} = (L_1 + e)/d \ldots \quad (10a)$$

$$\tan \alpha_{2max} = (L_2 + e)/d \ldots \quad (10b)$$

wherein $d$ is the thickness of the lamella 2 and $e$ is the offset between the arrays 41 and 42. Thus, the size of the second array 42 with respect to the dimension of the first array 41 can be determined:

$$L_2 = L_1 = d (\tan \alpha_{2max} - \tan \alpha_{2min}) \ldots \quad (11)$$

Figure 5:
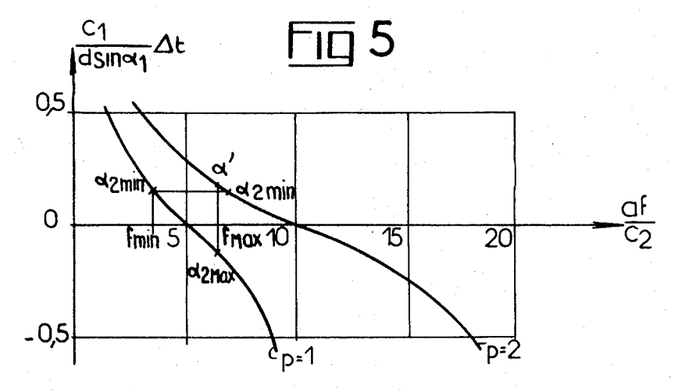
FIG. 5 is a graph to determine the band width of the line.

FIG. 5 illustrates the normalized variation defined in formula (6) above the delay time as a function of normalized frequency, formula 7 above, for a selected value of $m$, as determined by relationship (2) above, and for different values of $p = 1$ and $p = 2$ of the order of radiation. It is seen that there is no angular overlap of radiation of the second order with that of the first order within the wave band B selected. The band width, and the value $\alpha'$ of the angle of radiation of the second order for the maximum frequency $f_{max}$ of this band B must be less than the angle $\alpha_{2min}$. This imposes a limitation on the band width as a function of the coefficient $m$, that is, as a function of the materials of the media 1 and 2, and of the angle of incidence $\alpha_1$ which has been selected. The value of the angle $\alpha'$ can be used to select a lower limit for the offset $e$ of the two arrays 41 and 42, in accordance with the relationship $$e \geq d \tan \alpha' \ldots \quad (12)$$

The upper limit of the size of the array 41 and, at least of the array 42 then will be $$L_1 \geq d(\tan \alpha_{2min} - \tan \alpha') \ldots \quad (13)$$

The structure of this delay line is thus completely defined since the central frequency $f_o$ of the operating band width permits selection of the pitch $a$ of the arrays 41 and 42 by the following relationship:

$$af_o/C_2 = (C_1 C_2 \sin \alpha_1)/(C_2^2 \sin^2 \alpha_1 - C_1^2) \ldots \quad (14)$$

Figure 6:
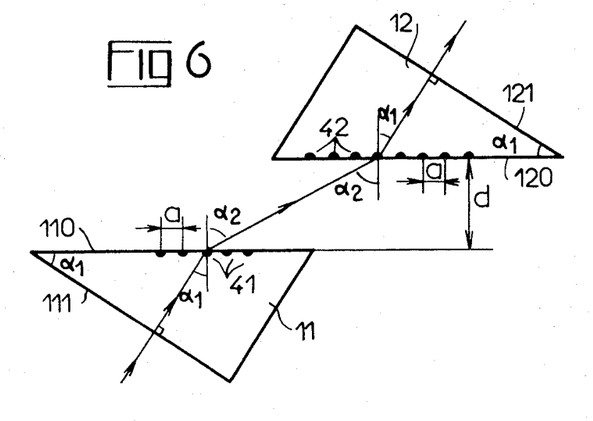
FIG. 6 is a diagram illustrating an optical delay line.

Device of FIG. 6 : Both light waves, as well as acoustical transverse waves with horizontal polarization propagate in an identical manner and thus a device of FIG. 6 can be used with optical waves. Two identical prisms 11, 12, of refraction index N have plane faces 110, 120 located parallel to each other, and separated by a distance $d$. The faces 110, 120 have arrays 41, 42 in the form of engraved, etched or similarly applied lines, with constant pitch spacing $a$. A bundle of light from a light source, such as a laser is applied perpendicularly to face 111 of prism 11. Face 111 makes an angle $\alpha_1$ with the face 110; this angle is greater than the refraction limit defined by $\sin \alpha = 1/N$. The grid array 41 on face 110 radiates the bundle between the two prisms under an angle $\alpha_2$ defined by $$\sin \alpha_2 = N \sin \alpha_1 - p(\lambda/a) \ldots \quad (15)$$

in which $\lambda$ is the wavelength in vacuum of the light wave. It can be seen that this formula is similar to formula (1a).

The radiated beam arrives at the array 42 of the second prism 12 under the same angle of incidence $\alpha_2$; by symmetry, an output beam is derived under an angle $\alpha_1$ from the second prism 12. This output beam is parallel to the direction of the entrance beam, regardless of the angle $\alpha_2$. The delay with respect to a reference taken from the input beam depends on the angle $\alpha_2$ and thus on the frequency of the light wave.

It can readily be seen that such a construction can be used for interferometers, in which light pulses, which are frequency modulated, are compressed; the structure may also be used for spectral analysis of light pulses, having a short duration with respect to the band of the variation $\Delta t$ of the delay time.

The family of curves of the delay time as a function of frequency as shown in FIGS. 2, 3 and 5 are equally applicable to the interferometer, if the relationship $C_2/C_1$ is replaced by N, and $C_2$ by C, the velocity of light in a vacuum.

Figure 7:
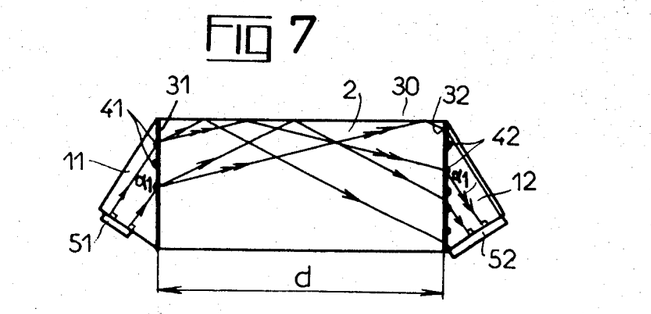
FIGS. 7 and 8 are schematic views of two embodiments of acoustic delay lines.

Embodiment of FIG. 7 : The operation of the acoustic delay line of FIG. 7 is similar to that of FIG. 4; a pair of prisms 11, 12 are symmetrically placed with respect to the lamella 2; the two transducers 51, 52 are not, however, parallel to each other but are inclined with respect to each other by an angle $\pi/2 - \alpha_1$ with respect to the faces 31, 32 of lamella 2. The waves which are diffracted by the first array 41 and then reflected at face 30 of the lamella 2 before being applied to the second array 42.

Figure 8:
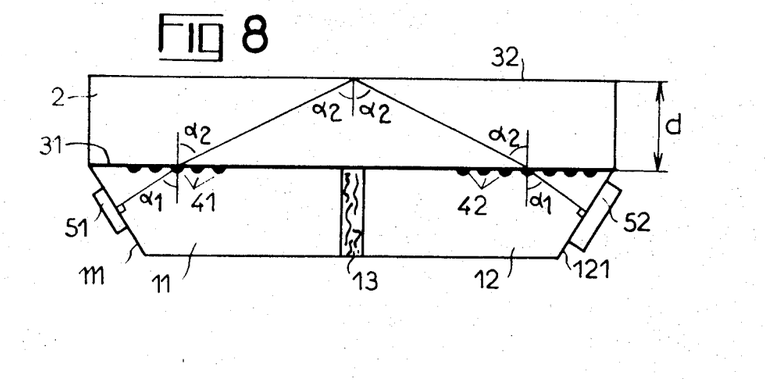

FIG. 8: The acoustic delay line has two prisms 11, 12 so arranged that both are applied to the same face 31 of lamella 2. The wave which is diffracted by the array 41 is reflected by surface 32 of the lamella 2 and then applied to the second array 42. This doubles the band of the variation $\Delta t$ of the time delay with respect to elements of FIG. 4, having equal thickness $d$. An additional advantage of this type of line is, that the band of the variation $\Delta t$ of the time delay can be adjusted by machining the face 32 of lamella 2 so that the thickness $d$ is reduced.

Figure 9:
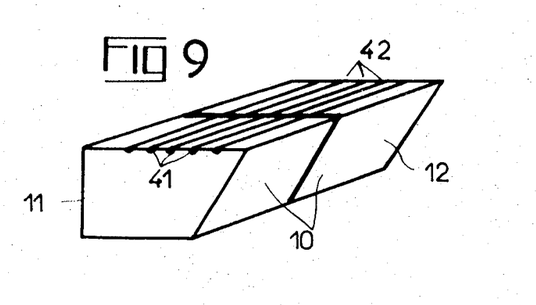
FIG. 9 is a perspective view of an element forming part of the delay lines of FIGS. 7 or 8.

As seen in FIG. 9, the arrays 41, 42 may be engraved simultaneously on a bar 10, for example of quartz, glass, or the like which is then severed perpendicularly to the lines of the array, to form the two prisms 11 and 12. The prisms 11, 12, are decoupled from each other by an acoustically absorbant material 13.

Figure 10:
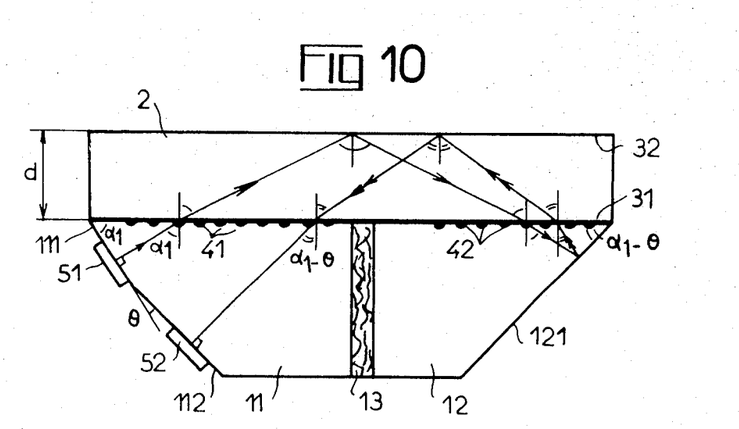
FIG. 10 is a schematic side view of another embodiment of an acoustic delay line.

FIG. 10 : This embodiment differs from that of FIG. 8 in that the face 121 of the prism 12 does not carry a receiving transducer but is formed to be reflective. Thus, in accordance with the principle of inverse reflection of waves, the output signal of the device could be received by the transmitting transducer 51, with a delay which is twice that obtained by the element of FIG. 8. However, the signals applied to the emitting transducer 51 are not always in pulse form and it is thus desirable to separate the emission and reception functions. This can be done without introducing any substantial modification into the device, and none in its principle of operation. It is only necessary to slightly change the inclination of the face 121 of prism 12 with respect to the face 31 of the lamella 2. Let $\alpha_1 - \theta$ be that angle ; the output wave is thus received by transducer 52 located on a facing 112 of prism 11. Facing 112 makes an angle equal to $\pi - \theta$ with respect to the facing 111 carrying the emitting transducer 51. The angle $\theta$ may be very small ; the sizes of the emitting transducer 51 and the receiving transducers 52 can be practically identical. The respective functions of these transducers, that is, reception or transmission, can thus be inverted.

Figure 11:
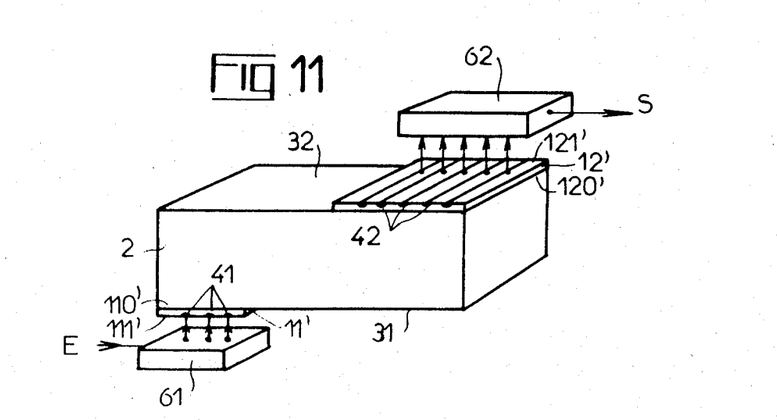
FIG. 11 is a perspective view of a different acoustic delay lines.

FIG. 11 : Two thin piezo electric ceramic transducers 11', 12' replace the prisms 11, 12, of the prior embodiments. The faces 110', 120' of transducers 11', 12' are applied to lamella 2, for example by adhesion. Grids 41, 42 forming parallel electrodes, as well as electrical connections are applied to the faces 111', 121' of the transducers 11', 12'. The electrodes are connected to corresponding delay lines 61, 62. The delay lines 61, 62 themselves operate in accordance with phase relationship defined by $$\omega_n = (\omega_m/C_2 na \ldots \quad (16)$$

$n$ is the number of the electrodes, $a$ the pitch or spacing of the lines, $\omega$ the angular frequency of the input signal E, $C_2$ the velocity of propagation of waves SH within the lamella 2 and $m$ is a number greater than one. The tapped delay line 61 of conventional type is provided with an input terminal E and the line 62 with an output terminal S.

The input signal E is applied to line 61 and transmitted to the electrodes of the array 41 in accordance with the above defined phase relationship, to excite the piezo electric ceramic lamella 11 by means of a transverse wave having a horizontal polarization which is parallel to that of the electrodes; this provides, effectively, an aligned radiation source emitting vibratory energy to the lamella body 2. It can be shown that this energy is radiated by means of a transverse wave with horizontal polarization under an angle $\alpha_2$, defined by the relationship $$\sin \alpha_2 = m - p(C_2)/(af) \ldots \quad (17)$$

considering $C_2/f = \lambda$ in medium 2, it is seen that the operation of this device is identical wit that of the delay line of FIG. 4 — see formula (1a).

A particularly interesting form of the device of FIG. 11 results when a thick lamella 2 is provided already of piezo electric ceramic, so that the arrays 41, 42 can be directly applied on the faces 31, 32 of the lamella 2 and this has an important advantage in the fact that different materials, such as mediums 1 and 2, are not necessary to use and a good adhering between the lamellas 2, 11' and 12' is provided.

The delay line has been illustrated and described in various examples; various changes and modification may be made within the inventive concept.

What is claimed, is:

1. Dispersive delay line with an approximately linear time delay variation versus frequency over a large relative bandwidth and operation based on surface wave diffraction by periodic gratings, said line comprising:

a propagation medium body 2 with parallel, plane faces 31, 32 and a thickness $d$ larger than the wavelength $\lambda$ of therein radiated elastic wave;

input and output elastic wave coupling means 1; 11, 12,...

input and output elastic wave type transducers 41, 42 located between said coupling means and at least one face of said medium and each comprising a plurality of rectilinear, co-planar, parallel grating elements presenting a periodic discontinuity in a corrugated pattern with an uniform corrugation pitch $a$ forming a diffraction grating, one said grating element upon excitation generating an input surface wave, or "lateral wave," and forming a bulk wave transducer 41 to propagate an elastic wave governed by a phase condition defined by the relationship $$\phi_n = (2\pi f)/(C_2) \, mna$$

wherein $n$ is the order number of the grating elements, $C_2$ is the radiated wave propagation velocity in the said medium 2, $f$ is the received wave frequency and $m$ is a parameter number, greater than one, depending on applied wave angle of incidence ($\sin \alpha_1$) and the wave velocity ratio ($C_2/C_1$) and chosen in accordance with the desired time delay ($\Delta t$) and the wave frequency variations, said input diffraction grating 41 radiating a shear-bulk wave having a direction of oscillation parallel to said grating elements and an angle of emergence $\alpha_2$ in said medium dependent on wave frequency in accordance with the relation $$\sin \alpha_2 = m - p(C_2)/(af)$$

wherein $p$ is a positive integer representing the diffraction order of the radiated wave energy, said wave energy being propagated through the medium irradiating the bulk-surface wave transducer output grating 42 at the same angle of incidence as the emergence angle $\alpha_2$.

2. Delay line according to claim 1, wherein said transmission medium 2 is of the type capable of transmitting an acoustic shear wave;

and the direction of oscillation of the applied wave coincides with the direction of oscillation of the shear wave generated by said transmission array 41.

3. Delay line according to claim 2 including (FIG. 4) a pair of acoustic wave transducers 51, 52 arranged to excite, or receive, polarized waves in a direction of polarization parallel to the elements of the arrays;

coupling prisms 11, 12 each having a face 110, 120 in contact with said medium 2 and another face 111, 121 in contact with a respective transducer;

the faces of the prisms 110, 120 which are in contact with the medium 2 making an angle $\alpha_1$ which is defined by $$\sin \alpha_1 = m(C_1/C_2)$$

wherein $C_1$ is the propagation phase velocity of said wave in the prism and $C_2$ is the propagation phase velocity in said medium.

4. Delay line according to claim 3, wherein said arrays are cut into the faces of the prisms in contact with said medium.

5. Delay line according to claim 4, wherein (FIG. 9) said prisms are severed portions 11, 12 of a single block 10 said block having said arrays cut therein transversely to the severence line severing said portion.

6. Delay line according to claim 2, wherein (FIG. 7) said medium 2 has a reflective surface;

and said arrays are located with respect to each other such that shear waves propagated into the medium reflect at said surface in their course from one array to the other.

7. Delay line according to claim 2, wherein (FIG. 8) said medium is in form of a lamella formed with a first face, said arrays being applied to said first face;

and said lamella is formed with a second face, said second face being reflective to shear waves applied thereto by said arrays.

8. Delay line according to claim 7, wherein said first and said second faces are parallel.

9. Delay line according to claim 1, wherein (FIGS. 1, 4, 7, 11) said medium 2 has a pair of parallel faces, and said arrays are applied to said parallel faces.

10. Delay line according to claim 1, including (FIGS. 4, 7, 8, 10) at least one coupling prism covering an array, and an electro-acoustic transducer applied to said prism, said prism having a oblique face with respect to the contact face of the prism covering the respective array.

11. Delay line according to claim 10, including (FIG. 10) a second coupling prism covering the other array and having a reflecting face which is oblique with respect to the contact face of said second array.

12. Delay line according to claim 11, wherein (FIG. 10) said first prism has a transmitter-electro acoustic transducer applied thereto polarized to excite vibrations in said medium parallel to said elements of the array; and further has a receiver-electro acoustic transducer applied thereto, one each, to a respective face oblique with respect to the contact face of said prisms with a respective array;

and said respective faces having said transducers applied thereto are inclined with respect to each other by an angle which is defined in accordance with the relationship $$\sin \alpha_1 = m\,(C_1/C_2)$$

wherein $C_1$ is the propagation phase velocity of said wave in the prism, $C_2$ is the propagation phase velocity in said medium and $m$ is a number greater than one.

13. Delay line according to claim 1, including (FIG. 11) an emitter piezo electric element;

a receiver piezo electric element;

said wave transmission and wave reception arrays being, respectively, cut into the respective piezoelectric elements, said piezo-electric elements being applied in contact with said medium 2;

said arrays comprising rectilinear parallel electrodes equidistantly placed on faces of said piezo electric element;

first delay means 61 applying to the respective electrodes of said emitter piezo element electrical potentials which are progressively delayed with respect to each other in accordance with the spacing of the electrodes;

and second delay means 62 connected to the respective electrodes of the receiver piezo electric element, said second delay means transducing the potentials applied to the electrodes thereof which are progressively delayed with respect to each other in accordance with the spacing of the electrodes and delivering delayed signals at an output terminal (S).

14. Delay line according to claim 13, wherein said medium is a plate of piezo electric material and forms said elements, the piezo electric electrodes being directly applied to faces of said plate of piezo electric medium.

15. Delay line according to claim 1, wherein (FIG. 6) said medium is a lamella of transparent material having a pair of planar parallel faces;

a pair of coupling prisms are provided applied to said plane faces of the lamella, and prisms covering said wave transmission and wave reception arrays, respectively;

one of said prisms having an input face located to receive luminous radiant energy at an angle in excess of the critical angle of refraction;

and said second prism having an output face located at an angle parallel to the angle of the input face of the first prism.

16. Method of delaying a wave signal, the delay being dependent on frequency of the signal comprising applying said signal to an array of parallel uniformly spaced grating elements on a medium capable of transmitting shear waves upon application of waves to said array;

and detecting said shear waves in said medium by a similar array applied thereto;

the step of applying said signal comprising the step of generating a polarized wave of said signal having a direction of polarization parallel to the elements of the arrays governed by the phase relationship $$\phi_n = (2\pi f/C_2)\,mna$$

wherein $n$ is the order number of the grating elements, $C_2$ is the radiated wave propagation velocity in the said medium 2, $f$ is the received wave frequency and $m$ is a parameter number, greater than one, depending on applied wave angle of incidence ($\sin \alpha_1$) and the wave velocity ratio ($C_2/C_1$) and chosen in accordance with the desired time delay ($\Delta\,t$) and the wave frequency variations;

the step of introducing a shear bulk wave having a direction of oscillation parallel to said grating elements and an angle of emergence $\alpha_2$ in said medium dependent on wave frequency in accordance with the relation $$\sin \alpha_2 = m - p\,(C_2/af)$$

wherein $p$ is a positive integer representing the diffraction order of the radiated wave energy, to propagate said wave energy through the medium;

and the step of detecting said shear wave comprising the step of detecting shear waves propagated under an angle $\alpha_2$.

17. Method according to claim 16, wherein said wave signal is an acoustic signal.

18. Method according to claim 16, wherein said wave signal is a radiation signal.

19. Method according to claim 18, wherein said wave signal is a luminous radiation signal.

20. Method according to claim 16, including the step of reflecting said shear wave in said medium intermediate the steps of applying said signal and detecting said signal.

* * * * *